July 16, 1963 R. J. CARPENTER 3,097,887
WHEEL MOUNTING FOR CART
Filed Oct. 13, 1960
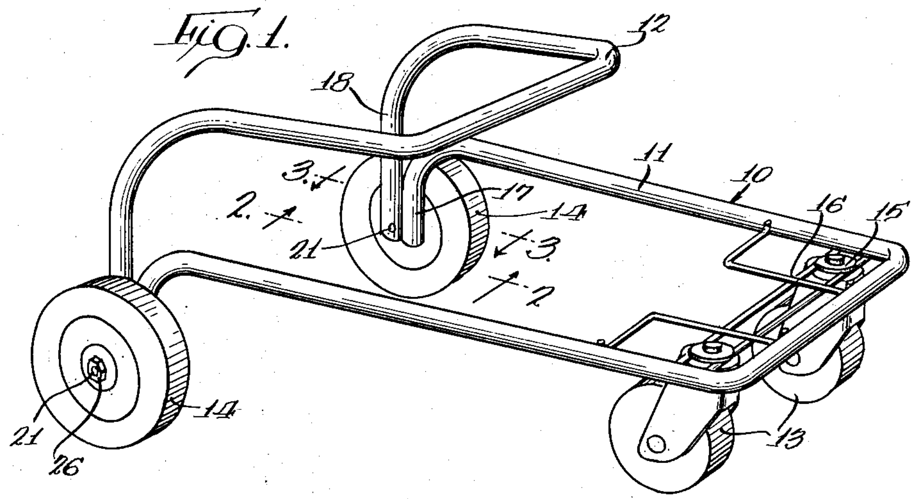
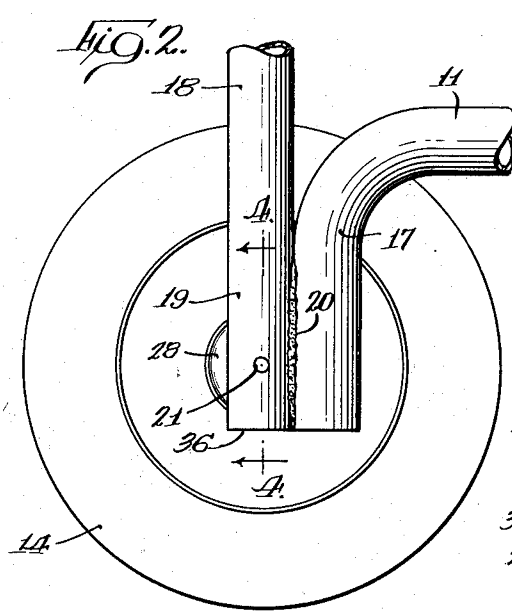
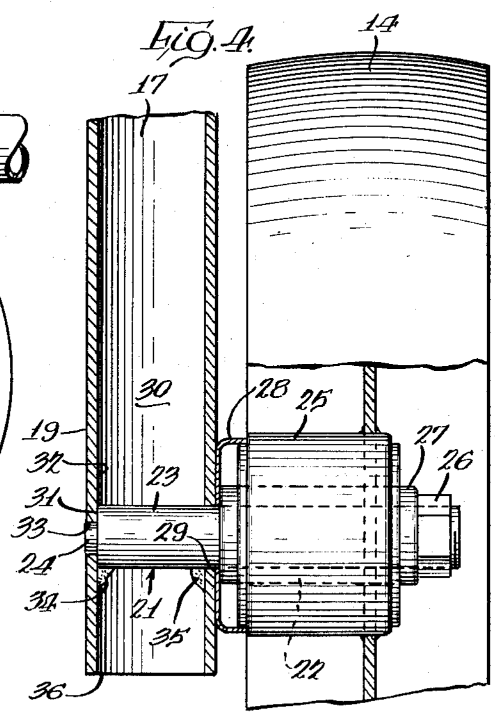
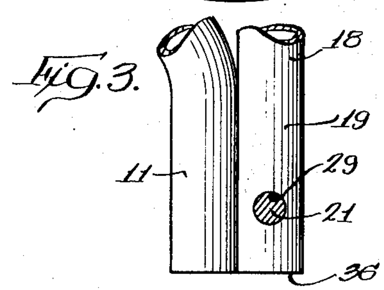
INVENTOR:
Robert J. Carpenter
BY
Hofgren, Brady, Wegner, Allen & Stellman
Att'ys United States Patent Office 3,097,887

Patented July 16, 1963

3,097,887

WHEEL MOUNTING FOR CART

Robert J. Carpenter, Jackson, Mich., assignor, by mesne assignments, to Tote-Cart Company, Chicago, Ill., a corporation of Illinois Filed Oct. 13, 1960, Ser. No. 62,382

1 Claim. (Cl. 301—1)

This invention relates to cart structures and in particular to means for mounting wheels on a cart base structure.

In carts, such as grocery carts, it is desirable to mount a pair of wheels at the rear of the base structure thereof, for rotation about fixed axes relative to the base structure. For facilitated movement of the cart, the front of the base structure is provided with swivelly mounted wheels. As substantial forces may be applied to the rear wheels, it is desirable to provide a strong rigid mounting thereof.

The present invention is concerned with such rigid mounting of wheels on a cart base structure. Thus, the principal feature of the invention is the provision of a new and improved means for rotatively mounting a wheel on a cart base structure.

Another feature of the invention is the provision of such mounting means including a tubular base structure portion having a first radial opening and a second opening diametrically aligned with the first opening, the second opening being transversely smaller than the first opening, an axle including a first outer portion for carrying a wheel for rotation about the axis thereof, a mid-portion extending through the first opening and diametrically across the interior of the tubular portion, and a second outer portion extending at least partially through the second opening, and means fixedly securing the mid-portion of the axle to the tubular base structure portion.

A further feature of the invention is the provision of such a mounting means wherein the mid-portion and second outer portion of the axle accurately fit the openings of the tubular base structure portion.

Still another feature of the invention is the provision of such a mounting means wherein the openings and mid-portion and second outer portion of the axle are circular in cross section.

Yet another feature of the invention is the provision of such a mounting means wherein the end of the mid-portion adjacent the second outer portion of the axle abuts the inner surface of the tubular base structure portion.

Still another feature of the invention is the provision of such a mounting means wherein the mid-portion of the axle is secured to the tubular base structure portion by weld means within the tubular base structure portion.

Other features and advantages of the invention will be apparent from the following description taken in connection with the accompanying drawing wherein:

FIG. 1 is an isometric view of a cart base structure provided with means embodying the invention for rotatively mounting a pair of wheels thereon;

FIG. 2 is a fragmentary elevation of a portion thereof taken in the direction of the arrows as shown in FIG. 1;

FIG. 3 is a fragmentary section taken substantially along the line 3—3 of FIG. 1; and FIG. 4 is an enlarged fragmentary section taken substantially along the line 4—4 of FIG. 2.

In the exemplary embodiment of the invention as disclosed in the drawing, a cart base structure generally designated 10, as may be used in a telescoping grocery cart, is shown to comprise a U-shaped, lower base member 11, an upper base member 12, a pair of front wheels 13, and a pair of rear wheels 14. Front wheels 13 may be of conventional construction, being swivelly mounted on the front end of the lower base member 11 by conventional swivel devices 15 carried on a wire support generally designated 16. The lower base member 11 and the upper base member 12 are preferably tubular, the lower base member 11 terminating rearwardly in a pair of downturned legs 17, and the upper base member 12 terminating rearwardly in a pair of relatively longer downturned legs 18 having the lower end 19 thereof juxtaposed rearwardly to the legs 17 of the lower base member. Leg portions 19 may be secured to legs 17 by weld means 20 to provide an improved rigid support at the rear of the base structure as disclosed in copending application Serial No. 33,473 of Harold I. Sides, the assignee hereof.

Referring now more specifically to FIGS. 2–4, the wheel mounting means of the instant invention may be seen to comprise an axle generally designated 21 defined by a first outer portion 22, a mid-portion 23, and a second outer portion 24. A suitable conventional bearing 25 is installed on axle outer portion 22 for carrying the wheel 14 for rotation about the axis of the axle 21. As best seen in FIG. 4, the bearing 25 is retained on axle portion 22 by a lock nut 26 acting against the inner raceway 27 of the bearing to urge the raceway 27 against a string guard 28 carried on the axle portion 22 between the raceway 27 and the leg 17.

Axle mid-portion 23 extends through a radial opening 29 in the lower end portion 19 of upper base member leg 18, and diametrically across the cylindrical space 30 to have its outer end 31 abut the inner surface 32 of the leg portion 19 opposite the opening 29. The leg portion 19 is further provided with a second opening 33 diametrically opposite opening 29, the opening 33 having a cross-section smaller than that of the opening 29 and receiving the second outer end 24 of the axle 21. Axle mid-portion 23 preferably has an accurate fit in opening 29 and axle second outer portion 24 preferably has an accurate fit in opening 33 to provide a rigid support of the axle in the leg end 19. In the illustrated embodiment, each of openings 29 and 33 are circular in transverse section, the axle portions 23 and 24 being complementarily cylindrical.

To secure the axle fixedly to the leg portion 19, the mid-portion 23 is secured to the inner surface 32 by suitable means such as welds 34 and 35 adjacent openings 29 and 33 respectively. The welds 34 and 35 may be readily made through the open end 36 of the leg 19, permitting an extremely strong joint of the axle to the leg end in a simple and economical manner.

As mid-portion 23 of the axle may be equal in diameter to the first outer portion 22 thereof carrying the wheel 14, an extremely strong and rigid wheel mounting means is obtained. Further, as the opening 33 may be substantially smaller than the opening 29, the leg end 19 remains relatively strong and rigid. Antithetically, the conventional wheel mounting means, wherein a relatively large diameter axle extends through each of the diametrically opposite portions of the leg, is relatively weak at the horizontal plane of the axle axis. While the diameter of the constant diameter axle may be decreased to permit a reduction in the diameter of the openings in such wheel mounting devices as has been done in the art to reduce the amount of weakening of the leg, this latter structure has the serious disadvantage of providing a substantially less rigid and weaker support of the wheel 14. Thus, the present invention provides a desirable strong, rigid wheel support while maintaining the leg of the base frame carrying the axle strong and rigid and, further, provides such a substantially improved rigid wheel mounting means in an extremely simple and economical manner.

While I have shown and described one embodiment of my invention, it is to be understood that it is capable of many modifications. Changes, therefore, in the construction and arrangement may be made without departing from the spirit and scope of the invention as defined in the appended claim.

I claim:

Means for rotatively mounting a wheel on a cart base structure comprising: a tubular base structure portion having an open end, a first radial opening and a second opening diametrically aligned with the first opening adjacent said open end, said second opening having a cross-section smaller than that of said first opening; an axle including a first outer portion, a mid-portion extending through said first opening and diametrically across the interior of said tubular portion, and a second outer portion extending at least partially through said second opening and terminating closely adjacent the outer surface of said tubular portion whereby the space outwardly of said second opening is unobstructed; means for removably rotatably retaining a wheel on said first outer portion of the axle; and weld means within said tubular portion fixedly securing said mid-portion of the axle to said tubular portion adjacent each of said openings, said open end providing facilitated access to the interior of said tubular portion in providing the weld means therein.

References Cited in the file of this patent

UNITED STATES PATENTS

| | | |
|---|---|---|
| 2,101,707 | Ewing | Dec. 7, 1937 |
| 2,123,388 | Viguerie | July 12, 1938 |
| 2,179,089 | Hauf | Nov. 7, 1939 |
| 2,635,011 | Hieb | Apr. 14, 1953 |